United States Patent [19]

Fox et al.

[11] Patent Number: 6,101,857
[45] Date of Patent: Aug. 15, 2000

[54] APPARATUS FOR MONITORING AND CONTROLLING PROGRESSIVE PUNCH PRESS PRODUCTION OF ARTICLES AND ASSOCIATED METHOD

[75] Inventors: Ronald R. Fox, Glenshaw; Samuel A. Rummel, Butler, both of Pa.

[73] Assignee: Oberg Industries, Freeport, Pa.

[21] Appl. No.: 09/286,898

[22] Filed: Apr. 6, 1999

[51] Int. Cl.⁷ .................................................. B21C 51/00
[52] U.S. Cl. .......................... 72/15.1; 72/20.1; 72/21.1; 72/21.4; 700/174; 700/175
[58] Field of Search .................................. 72/14.8, 15.1, 72/17.1, 17.2, 20.1, 20.2, 21.1, 21.4; 29/598; 364/476.01, 474.15, 474.16, 474.17, 468.15, 468.21; 73/763, 768, 774–777

[56] References Cited

U.S. PATENT DOCUMENTS

| | | |
|---|---|---|
| 4,945,770 | 8/1990 | Alvelid et al. ............................ 73/768 |
| 5,181,975 | 1/1993 | Pollack et al. . |
| 5,241,138 | 8/1993 | Neuenschwander . |
| 5,347,870 | 9/1994 | Dosch et al. ............................. 73/769 |
| 5,377,115 | 12/1994 | Neuenschwander . |
| 5,422,636 | 6/1995 | Urbas et al. . |
| 5,539,778 | 7/1996 | Kienzler et al. . |
| 5,622,069 | 4/1997 | Walters . |
| 5,663,716 | 9/1997 | Miwa et al. . |
| 5,872,316 | 2/1999 | Duggirala et al. ........................ 73/768 |
| 5,941,110 | 8/1999 | Cao et al. ................................ 72/21.4 |
| 5,941,111 | 8/1999 | Skala et al. .............................. 72/21.4 |

*Primary Examiner*—Ed Tolan
*Attorney, Agent, or Firm*—Arnold B. Silverman; Eckert Seamans Cherin & Mellott, LLC

[57] ABSTRACT

Apparatus for progressively manufacturing fabricated or semi-fabricated articles, such as a rotor or stator assembly, includes a punch press and a progressive stamping die for creating the assemblies from sheet stock moving therebetween. A microcontroller board or network, including a plurality of microcontroller boards, is secured to the die for controlling operation of the apparatus responsive to information provided to them. Sensors are provided for monitoring operation of the apparatus and providing such information to the microcontroller boards. The communication system provides for communication between the sensors and the logic chips, among the logic chips and among the microcontroller boards and between the microcontroller boards and other portions of the apparatus which are to be subjected to responsive control. In a preferred embodiment, the microcontroller boards are positioned within a container which is secured in a recess in the progressive die and has an overlying material, such as an epoxy, covering all of the logic chips such that efforts to remove the material will at least partially destroy the chips. The die and microcontroller boards may be secured to and removed from the press as a unit. An associated method is disclosed.

43 Claims, 9 Drawing Sheets

APPARATUS FOR MONITORING AND CONTROLLING PROGRESSIVE PUNCH PRESS PRODUCTION OF ARTICLES AND ASSOCIATED METHOD

BACKGROUND OF THE INVENTION

1. Field of the Invention

The present invention relates to a progressive stamping die for a punch press and, more specifically, it relates to the use of a plurality of networked microcontroller boards which through appropriate sensors providing information thereto regarding press and die conditions and control signals being emitted therefrom, effects monitoring and control of the stamping and in-die fabricating processes.

2. Description of the Prior Art

Various means of monitoring events in a die in a progressive punch press have been known. The use of a central processing unit for such purposes has been known.

The automated manufacture of stacks of stators or rotors out of metal strip stock in a progressive die fashion employing a punch press has long been known. See, for example, U.S. Pat. Nos. 5,377,115 and 5,622,069, the disclosures of which are incorporated herein by reference. In such prior art systems, it has been known to advance the strip stock between a punch and cooperating die with the formation of the individual stators or rotors being effected sequentially with ultimate separation of the individual rotor or stator elements from the parent stock. Individual rotor or stator lamina have been rotated and interlocked in order to provide an effective stack of uniform thickness.

In connection with such prior art systems, it has been known to monitor such features as lamina thickness and press position to control features such as counter-bore, rotation, skew and part height. The prior art practices generally involved the use of a remotely positioned central processing unit which employed a large number of individual cables which had to be connected separately to the various sensors and elements, such as rotation effecting motors. One of the problems with such an approach is the requirement that those working with and on the equipment have a significant degree of skill relating to the in-die fabrication process and maintaining the control equipment.

It has also been known to provide visual displays associated with the monitored function so that an operator could view a panel and get an indication of the nature of a problem if one occurred. Among the messages which might be delivered to an operator would be an indication of a problem with press position, misfeed, double thickness or bottom dead center.

It has also been known to facilitate the use of additional sensors by using intermediate connector boxes.

In spite of the foregoing known systems, there remains a very real and substantial need for improved die monitoring and controlling apparatus for use in progressive punch and die fabricating systems including, but not limited to, the use of such systems in the creation of stators and rotors from metal strip stock.

SUMMARY OF THE INVENTION

The present invention has met the above-described needs by providing a punch press having a punch and cooperating progressive metal stamping die for creating rotor or stator assemblies or other products or semi-fabricated products. One or more microcontroller boards have a plurality of logic chips secured thereto and are secured to and preferably within the bottom die shoe. Sensor means for monitoring operation of the apparatus and providing information to the logic chips are provided. Communication means serve to effect communication between the microcontroller boards. The microcontroller boards provide information regarding the monitored conditions and control signals which control the operation of the in-die fabricating process.

The communications means also permit communication among microcontroller boards on an event basis, as desired.

Each microcontroller board is preferably positioned within a container which is filled with a material, such as an epoxy, such that the entire container may be secured within a recess in the die. Efforts to gain access to the logic chips will result in at least partial destruction of the same.

A corresponding method of monitoring and controlling progressive punch press operation is provided.

It is an object of the present invention to provide a die monitoring system for in-die fabricating processes.

It is an object of the present invention to provide a plurality of punches and cooperating metal stamping dies for use in a punch press in creating stacks of rotors and/or stators by providing microcontroller boards which boards are secured to a punch or die section and preferably embedded within the same.

It is a further object of the present invention to provide such apparatus which eliminates the need for a central processing unit and multiple cables associated with such systems.

It is a further object of the present invention to provide such a system wherein the microcontroller boards which control all or a significant portion of the operation of the in-die fabrication process are a part of the die.

It is another object of the present invention to provide such a system which has efficient communication means receiving information from sensors and transmitting control signals and process related information to microcontroller boards formed as part of the die, in order to initiate control functions.

It is another object of the present invention to provide such a system which facilitates increased operating speed of such punch press progressive die systems.

It is a further object of the present invention to provide a system which is adapted to function as an event based system in delivering information regarding the apparatus to microprocessor boards.

It is a further object of the present invention to provide such a system which resists reverse engineering of the control logic functions.

It is yet another object of the present invention to reduce the need for press operators skilled in the art of electronics and the in-die fabricating process.

It is yet another object of the present invention to provide for a method of monitoring and controlling progressive punch die production of articles in accordance with the foregoing objects.

These and other objects of the invention will be more fully understood from the following description of the invention on reference to the illustrations appended hereto.

DESCRIPTION OF THE PREFERRED EMBODIMENTS

Figure 1:
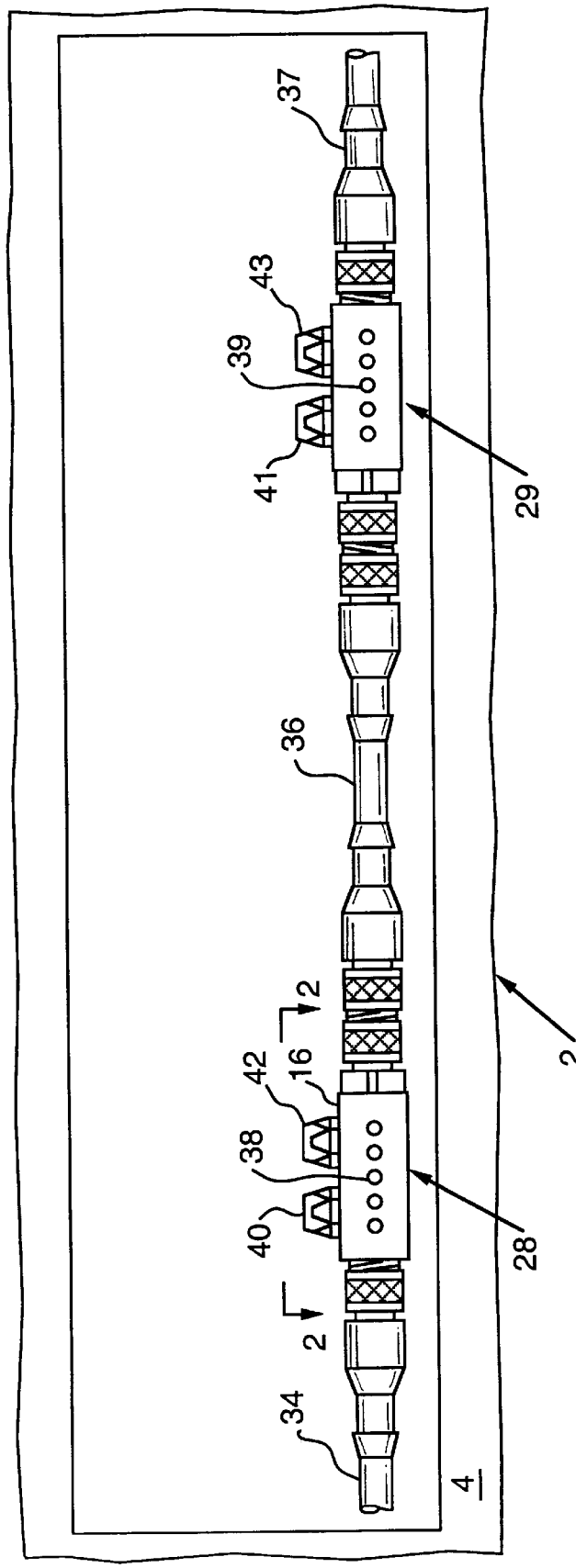
FIG. 1 is a partially schematic top plan view of a form of progressive die incorporating two microcontroller modules of the present invention.

A feature of the present invention is the use of one or more microcontroller boards which are secured to the punch section or die section, or both. The microcontroller boards are preferably secured within recesses in the die section or punch section, or both. The microcontroller boards are preferably positioned within a container with a suitable material, such as an epoxy holding the board in place within the container which is positioned within the recess. The container, embedding material and microcontroller board may be considered to provide a control module. Each module may contain one or more microcontroller boards and a number of modules may be secured within the die section or punch section, or both. Each microcontroller board may perform one function or multiple functions. This arrangement provides design flexibility. For example, 1 to 8 modules, each having 1 to 4 functions and one or more microcontroller boards may be secured within the punch section, and 1 to 5 such modules may be secured within the die section.

Referring to FIGS. 1 through 4, there is shown a die section of a punch and die set 2 secured within a punch press 4 so as to cooperate with other progressive die sets (not shown) in progressively converting an elongated metal strip into semi-fabricated or fabricated articles, such as stacks of rotors or stators. Microcontroller board 10, which may be any type of electrically insulative board such as that used in creating printed electrically conductive circuits, is positioned within a container 16 which is upwardly open and is received within an upwardly open recess 20 in die 2. A plurality of microcontroller boards 10, which may be provided in any desired number, and may have logic chips secured to one or both surfaces thereof, each tend to serve different functions in die monitoring or progressive punch sections/die section manufacture of an article and are disposed in relative spaced relationship. A material 30, such as an epoxy or suitable resinous plastic, for example, preferably completely surrounds and encapsulates the microcontroller boards 10 such that efforts to gain access to the boards 10 will result in at least partial destruction of the boards 10 so as to resist undesired reverse engineering of the same. The container 16, which may be a metal box, is in the form shown secured to the die 2 retained in the die recess 20. If desired, metal fasteners may be employed.

The container 16 has a cover 22 secured thereto by fasteners 24, 26 which may be threaded bolts. The microprocessor boards containing modules 28, 29 are interconnected by suitable signal and power cables 34, 36, 37. Cables 34, 36, 37 serve to provide a source of power for the microprocessor boards 10 and to transmit signals to cooperating the microprocessor boards 10 and transmit signals therefrom.

Figure 3:
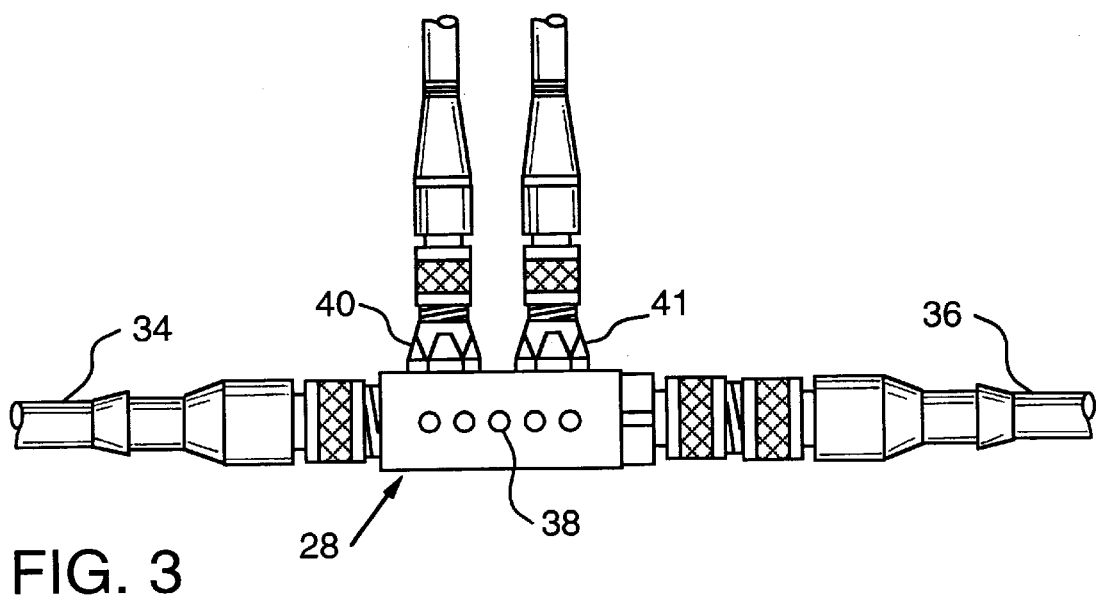
FIG. 3 is a top plan view showing a single modular unit of the present invention.
Figure 4:
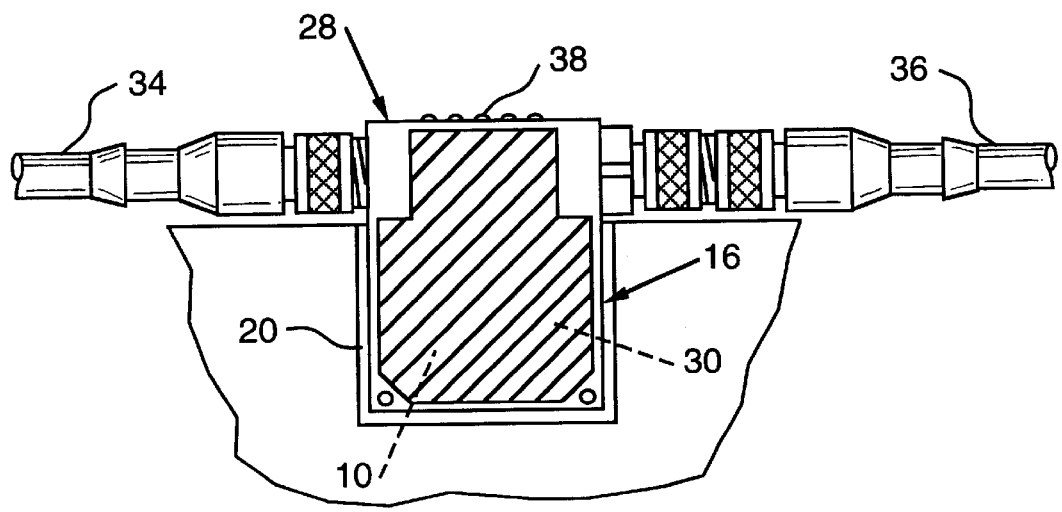
FIG. 4 is a partially schematic elevational view similar to FIG. 2.

As shown in FIG. 3, network indicators LED 38, 39 may be provided to indicate that the network is functioning. Sensor/control connections 40, 41, 42, 43 are provided. Further details are shown in FIG. 4. Cables 34, 36 serve as a means for electrically energizing the board or boards 10 and as a means for providing communications between the board or boards 10 and the communication system which will be described hereinafter.

Figure 5:
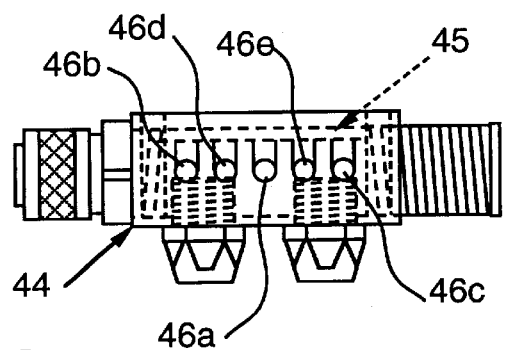
FIG. 5 is a top plan view of a modular unit employing a single microcontroller board.
Figure 6:
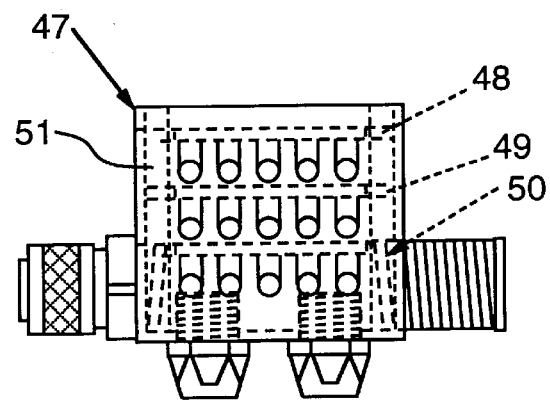
FIG. 6 is a top plan view of a module employing a plurality of microcontroller boards.

FIG. 5 shows a microcontroller module 44 having a single microcontroller board 45 which contains the desired intelligent logic chips (not shown) and the associated electrical power and communications connections including a network indicator LED 46a which indicates the status of the network, LED's 46b, 46c which indicate messages, and LED's 46d, 46e which indicate I/O status. FIG. 6 is similar to FIG. 5, but shows a microcontroller module 47 which has three relatively spaced microcontroller boards 48, 49, 50 embedded within a suitable material such as an epoxy.

Figure 7:
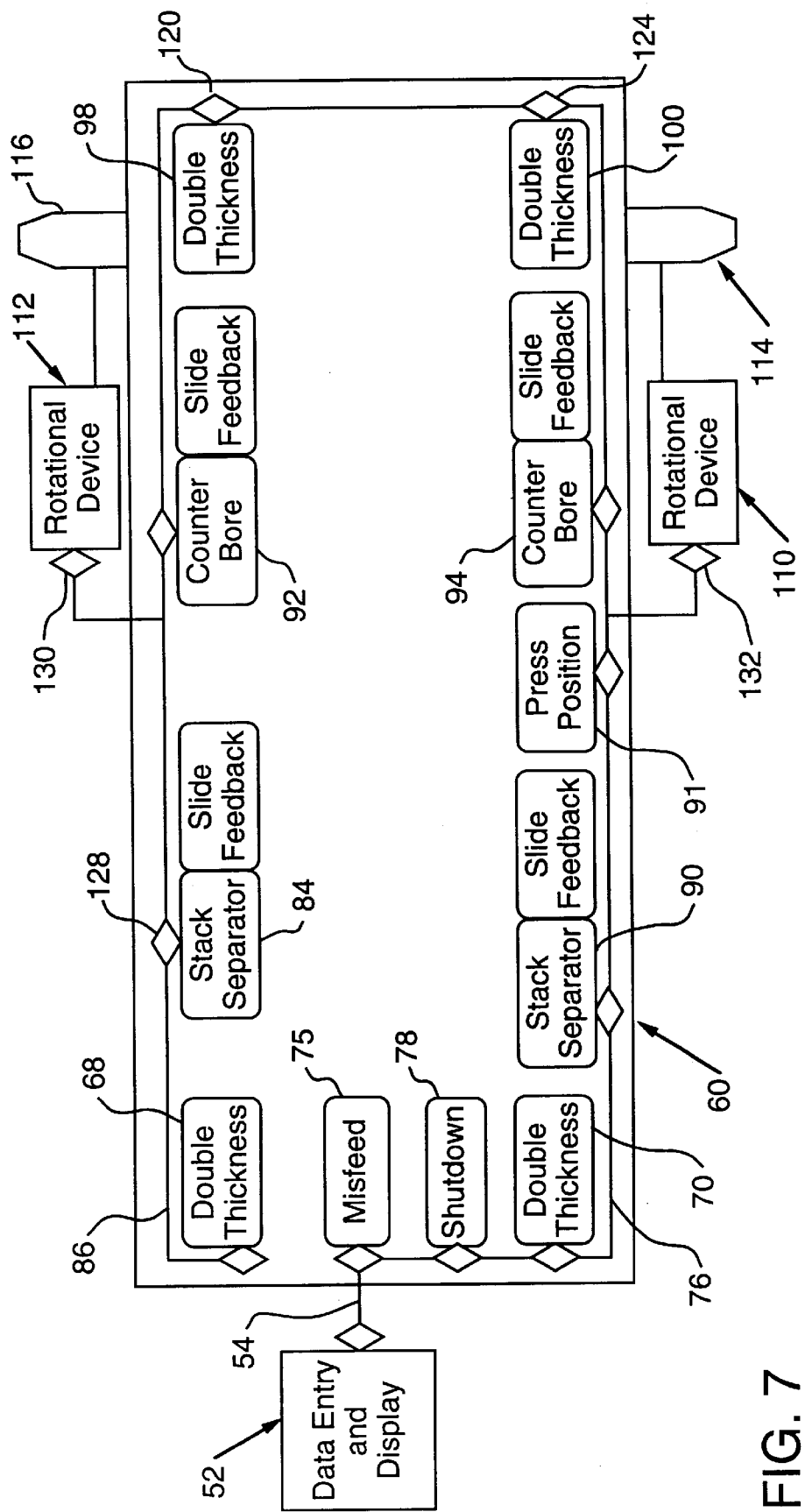
FIG. 7 is a block diagram of a progressive stamping die showing various microprocessor modules thereon and its interconnection with the operating means for the rotational device and the data entry and display system.

FIG. 7 shows an example of a networked system of microprocessor boards usable in the present invention. In general, it will be appreciated that each microprocessor board of the plurality of microprocessor boards, such as microprocessor boards 10 shown in FIGS. 2 and 4, or board 45 of FIG. 5, or boards 48, 49, 50 of FIG. 6, will perform certain specific functions. Throughout FIG. 7, the presence of a diamond, such as diamonds 120, 124 indicates that there is a network connection between the individual microprocessor units. Leads 76, 86 provide network connections. The die 60 is connected to a data entry and display unit 52 by line 54. The die 60 shown in FIG. 7 has a plurality of functional units. There are four double thickness units 68, 70, 98, 100 to provide monitoring for double thickness in the four corners of the die. Double thickness sensor information could provide an indication that an undesired double layer of material is present or that a foreign object is on top of the desired single layer or that the stripper did not go all the way down. The misfeed module 75 involves the microcontroller and sensor combination monitoring the pilot holes in the strip to make sure that they are being fed in a properly indexed manner.

The shutdown module 78 is adapted to effect press shutdown as a result of predetermined operating conditions.

The stack separator microcontrollers 84, 90 with their associated slide feedback monitors are responsive to control signals from the press position microcontroller 91, as well as the material thickness data from thickness measurement microcontroller (not shown). The thickness measurement devices may be mounted exteriorly of the die. An in-die measuring unit may be used in lieu thereof, if desired. The stack separators 84, 90 sends a signal to a solenoid that separates the stack. A sensor is employed to monitor the position of a slide that activates or deactivates the stack separator punch. This is the slide feedback portion of the stack separator 84, 90. The slide feedback function is bundled with the slide control devices "stack separator" and "counter-bore." The microcontroller labeled double thickness 68, 70, 98, 100 provide monitoring for double thickness material in the four corners of the die.

It will be appreciated that as shown in FIG. 7, the communications lead 54 is a single common network connection that facilitates the transfer of control signals to the various individual microcontroller boards 10 as illustrated by the diamonds, such as 120, 124 and 128, for example, as well as to the data entry and display unit 52. Note also the diamonds 130, 132 which are connected to rotational devices 110, 112, which are respectively driven by motor units 114, 116. The control functions on the individual microcontroller boards communicate over the network.

Figure 8:
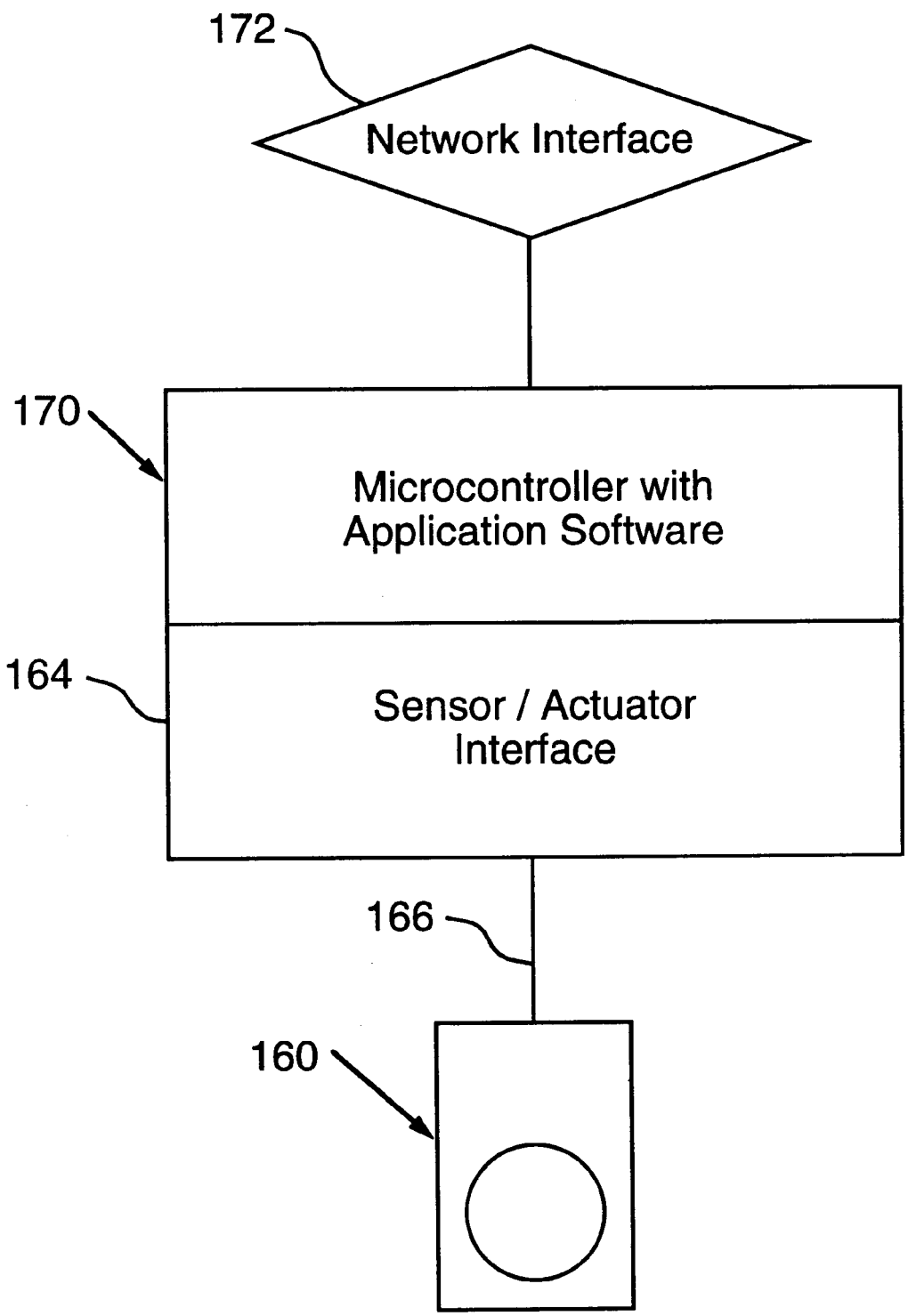
FIG. 8 is a schematic illustration showing a sensor and respective interfaces along with the microcontroller having the application software.
Figure 9A:
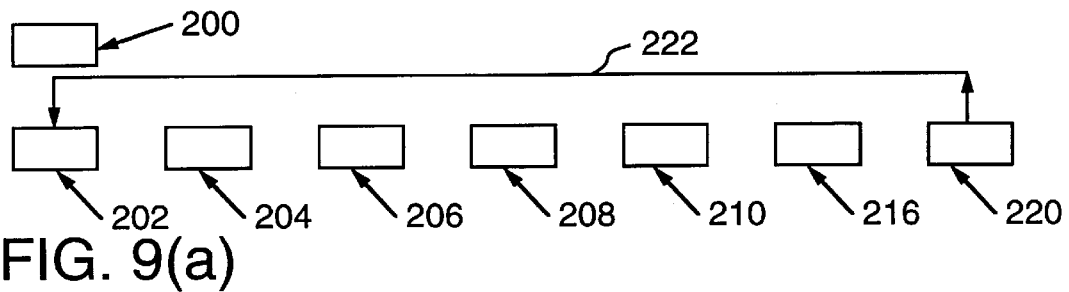
FIGS. 9(a)–(f) show a series of communications among the microcontroller board modules in order to configure parameters.
Figure 9B:
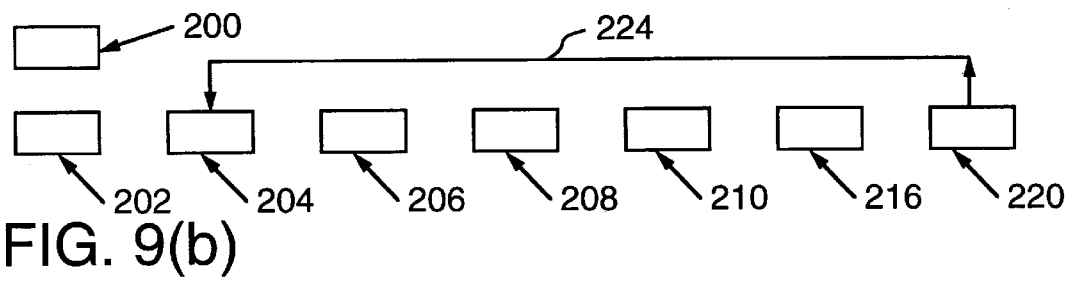
Figure 9C:
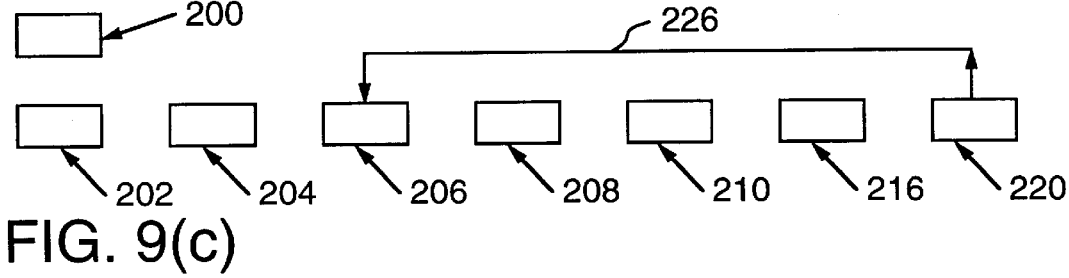
Figure 9D:
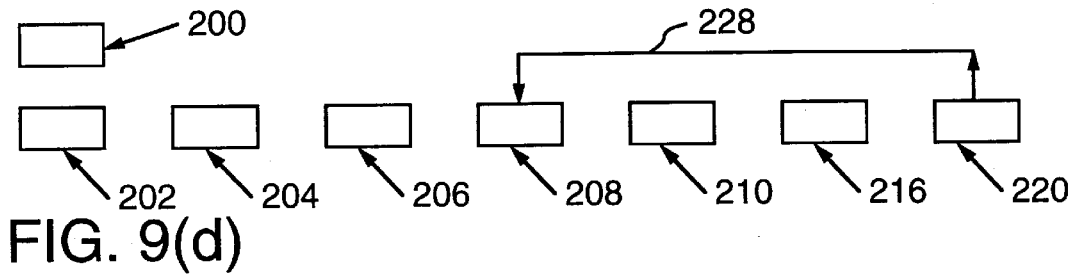
Figure 9E:
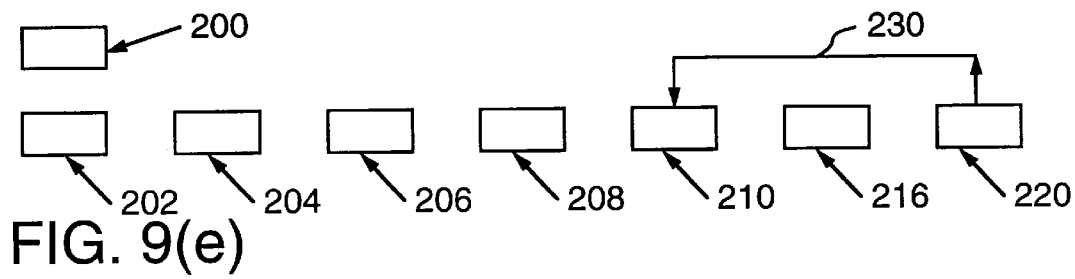
Figure 9F:
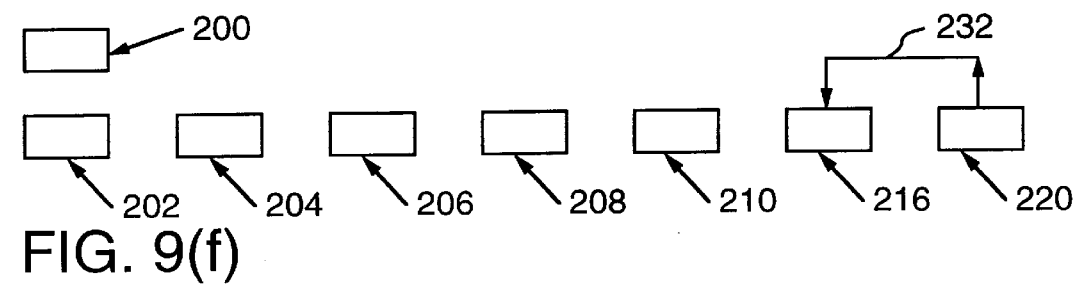
Figure 10A:
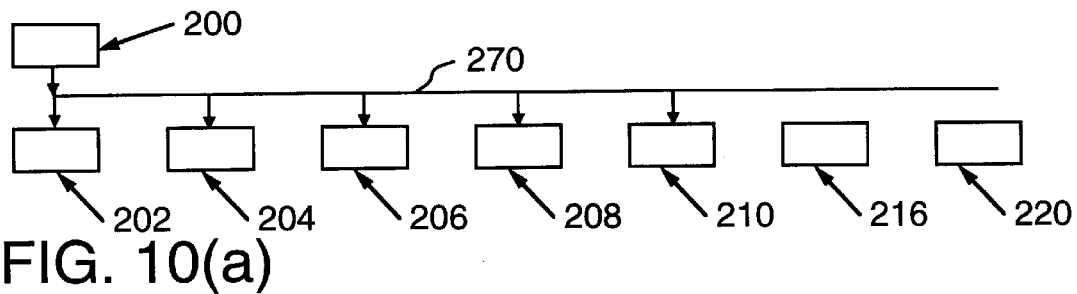
FIGS. 10(a)–(f) are a schematic illustration of the microcontroller board modules on a form of microcontroller board illustrating examples of control messages.
Figure 10B:
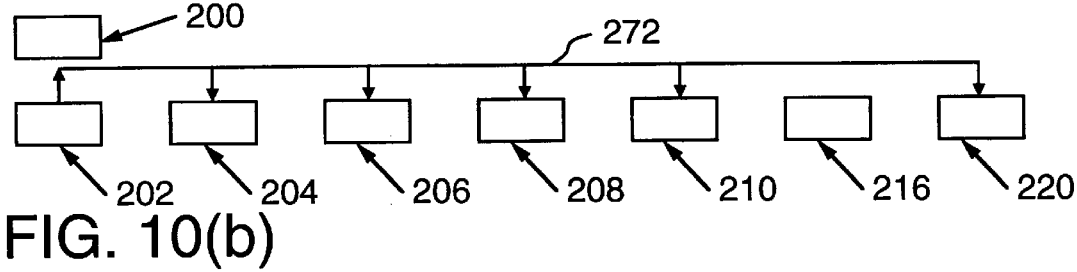
Figure 10C:
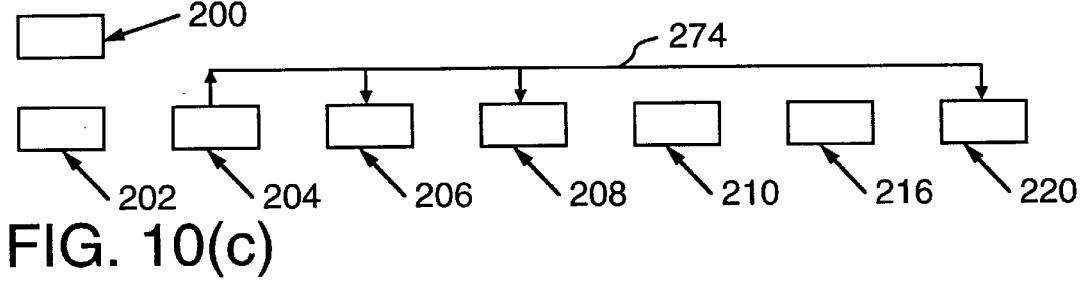
Figure 10D:
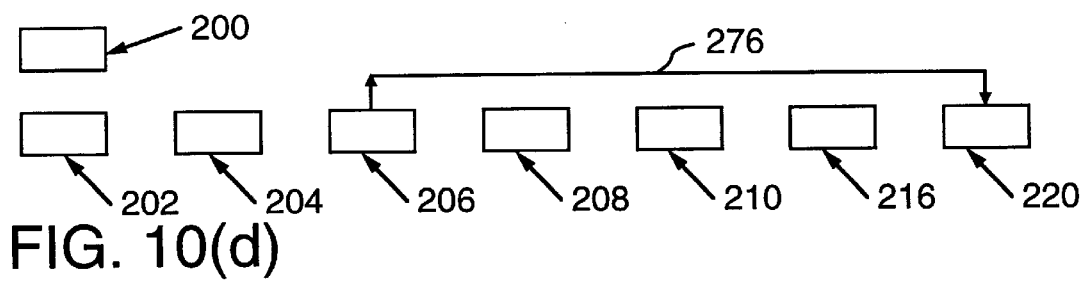
Figure 10E:
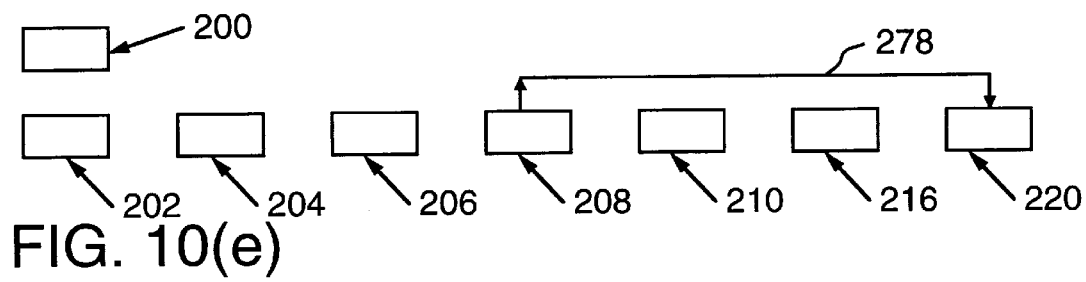
Figure 10F:
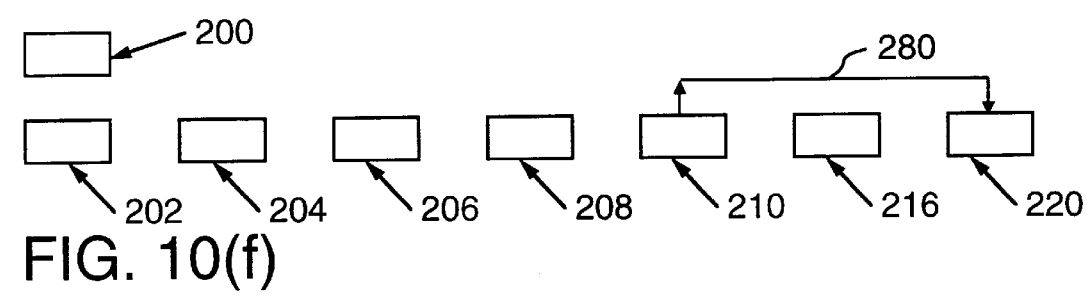
Figure 11A:
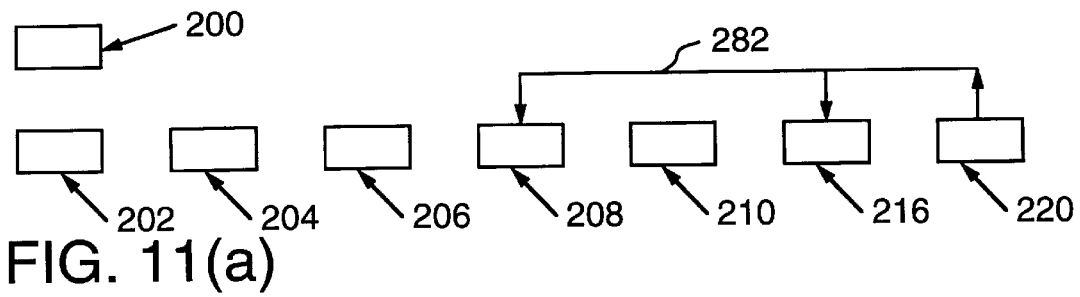
FIGS. 11(a)–(d) are a schematic illustration of the microcontroller board modules showing examples of fault messages.
Figure 11B:
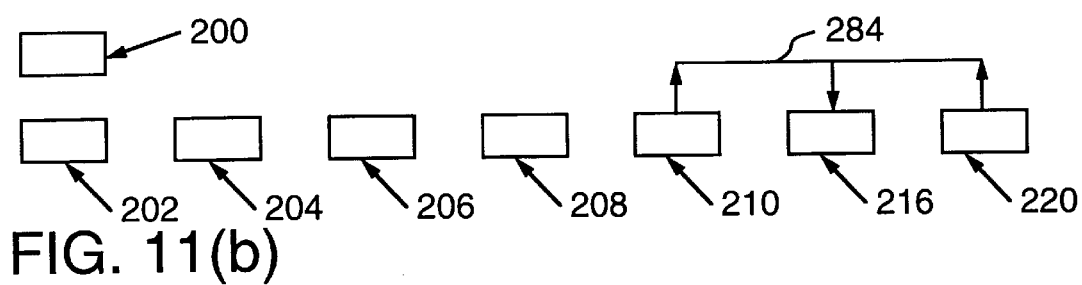
Figure 11C:
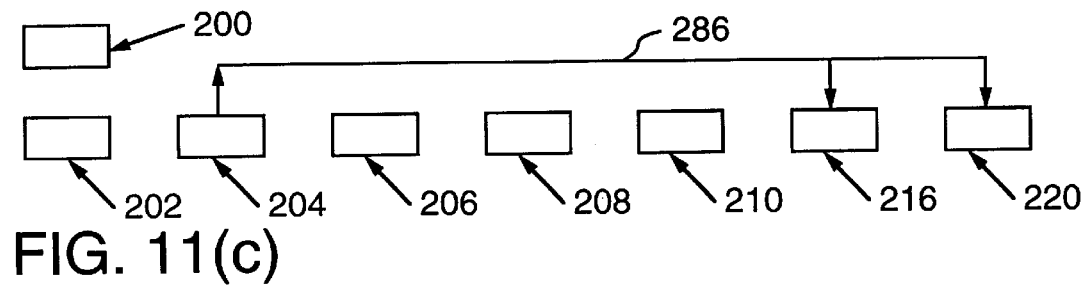
Figure 11D:
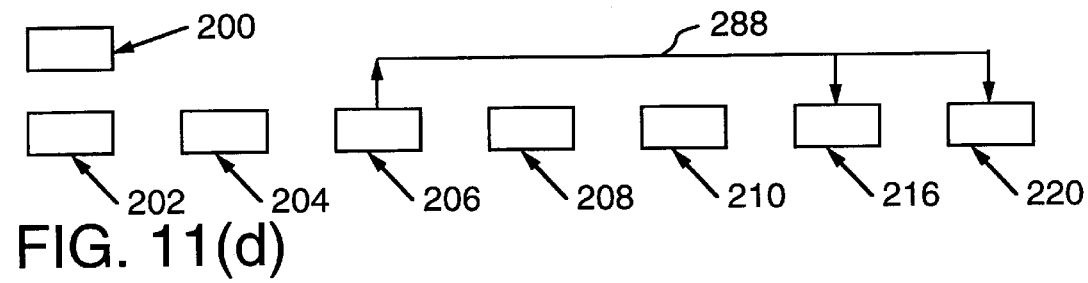

Referring to FIG. 8, there is shown a typical module anatomy wherein an interface between a sensor and the communications network or actuator and the communication network is illustrated. A sensor 160 or actuator is connected to the sensor/actuator interface 164 by lead 166. A microcontroller board 170 containing application software is operatively associated with the network interface 172. In communications going to the microcontroller board 170 from the sensor 160 or actuator, the signal will pass through the sensor/actuator interface 164 to the microcontroller board 170 and then will have output communications responsive thereto passing through the network interface 172.

FIGS. 9, 10 and 11 are schematic illustrations related to the communication systems with emphasis respectively on the parameter messages, control messages and fault messages.

In general, the plurality of microprocessor boards may be mounted within the die section or the punch section (or both) with the former generally being preferred. The particular configuration and desired functioning of a system will tend to determine which modules are placed on a given die.

Referring to FIGS. 9(*a*)–(*f*) with initial attention to FIG. 9(*a*), the press position module 200 will be on a microprocessor board in the form shown along with thickness measurement module 202, stack generation module 204, counter-bore module 206, user output 208, sensor monitor 210, shutdown module 216 and the communications module designated "HMI" 220. In the form shown, a communication link has been established between the communication module 220 and the thickness measurement 202 over communication line 222. This will enable the system setup wherein the thickness measurement module 202 is configured to control the interaction with the sensors measuring thickness. As with all of the modules, the configuration parameters will be established for each module having a particular function such as thickness measurement 202, for example. The user output 208 is selected merely as an example of a special implementation for a particular purpose and other functions may be employed.

Referring to FIG. 9(*b*), it will be noted that the communications module 220 is configuring parameters for stack generation 204 over line 224. In FIG. 7(*c*), the communication module 220 is configuring the parameters for the counter-bore module 206 over line 226.

In FIG. 9(*d*), the communications module 220 is in communication over line 228 with user output module 208 to provide the configuring parameters therefor.

In FIG. 9(*e*), the communications module 220 is in communication over line 230 with the sensor monitor 210 to configure the same.

In FIG. 9(*f*), there is shown the communications module 220 in communication over line 232 with the shutdown module 216 for configuring the latter.

Referring to FIGS. 10(*a*)–(*f*), there is shown a sequence of examples of control messages handled by the communications system of the present invention.

Referring to FIG. 10(*a*), it is seen that the communications system receives from the press position module 200 and a signal which goes to the thickness measurement module 202, the stack generation module 204, the counter-bore 206, the user output module 208 and the sensor monitor 210 over lead 270. This information permits the microprocessor boards to make use of the information regarding press position and to trigger an appropriate response where desired.

In FIG. 10(*b*), the thickness measurement module 202 emits a signal over lead 272 to stack generation module 204, counter-bore module 206, user output module 208, sensor monitor module 210 and communications module 220. This provides a thickness value to the other modules and the communications module.

Figure 2:
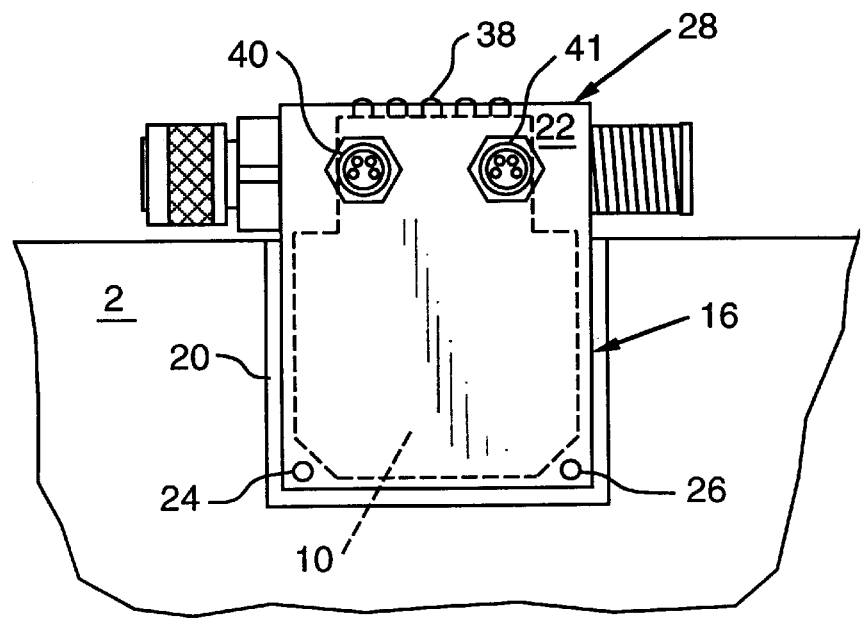
FIG. 2 is a cross-sectional illustration of the die of FIG. 1 taken through 2—2 of FIG. 1.

In FIG. 10(*c*), data is set from stack generation module 204 over lead 274 to counter-bore module 206, user output module 208 and communications module 220. In FIG. 2(*d*), data is sent from counter-bore module 206 to communications module 220 over lead 276.

FIG. 10(*e*) shows a representation of user output module 208 sending data over lead 278 to communications module 220. In FIG. 10(*f*), there is shown the sensor monitor 210 emitting data over lead 280 to communications module 220. It will be appreciated that in this manner, the various modules deliver information to other modules in the system.

Referring to FIG. 11, the handling of fault messages will be considered. In FIG. 11(*a*), the communications module 220 delivers over lead 282 a fault message to user output module 208 and shutdown module 216 in order to shutdown the press. In FIG. 11(*b*), the communications module 220 and the sensor monitor module 210 send fault messages over lead 284 to shutdown module 216. Similarly, in FIG. 11(*c*), a fault message is sent over lead 286 from stack generation module 204 to shutdown module 216 and communications module 220. In FIG. 11(*d*), there is shown a fault message emerging from counter-bore module 206 over lead 288 to shutdown module 216 and communications module 220. It will be appreciated that each of these modules is designed to emit an appropriate fault signal to the desired destinations when a problem of a predetermined nature is perceived.

Figure 12:
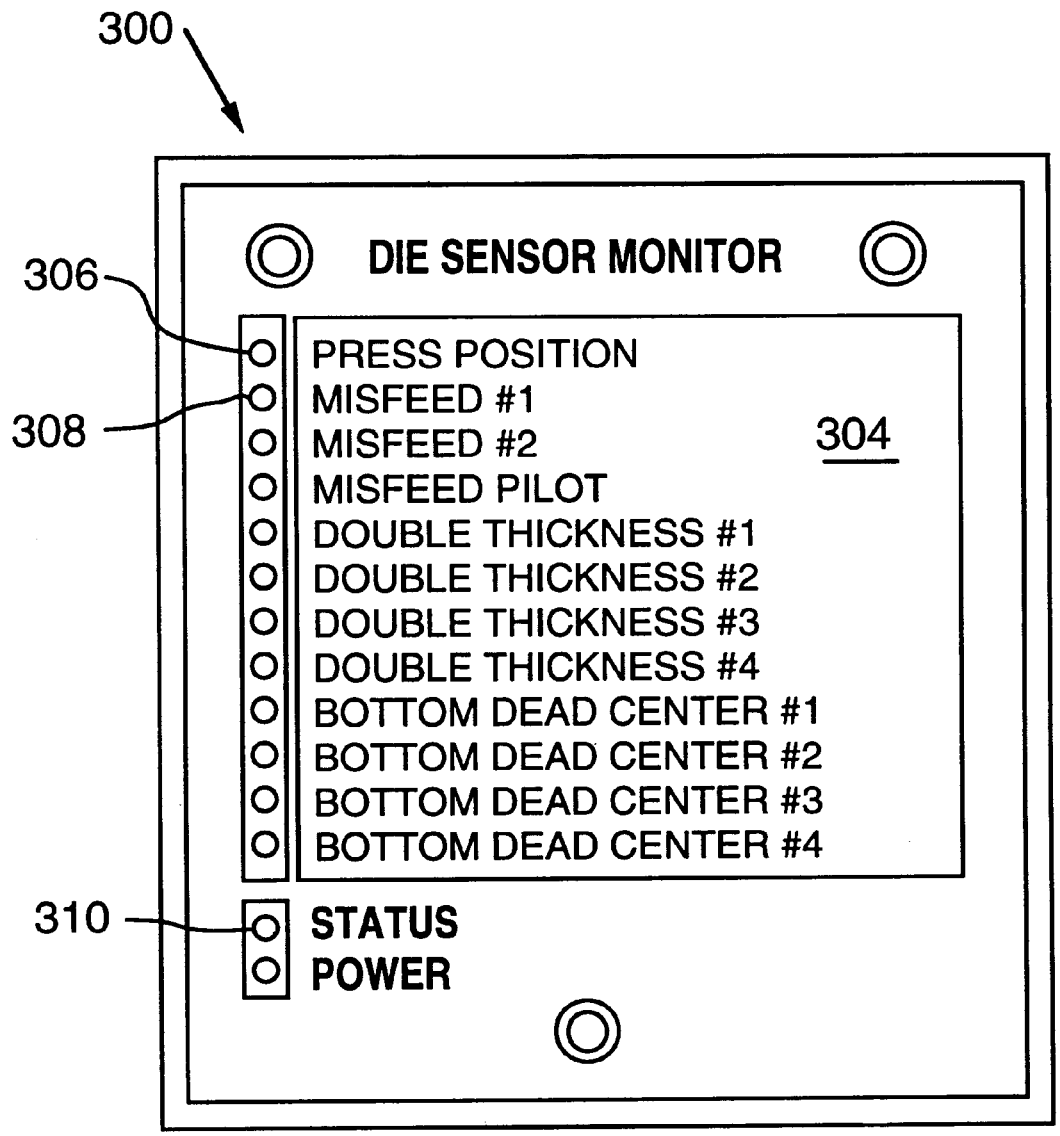
FIG. 12 is an illustration of an example of a die sensor monitor for providing a visual indication of certain aspects of the functioning of the system.

Referring to FIG. 12, there is shown a die sensor module 300 which has a display window 304 having a plurality of messages, such as "PRESS POSITION" and "MISFEED #1" with adjacent light emitting diodes 306, 308, for example, which illuminate to permit visual observation of the nature of a particular problem. A status and power portion 310 also contains light emitting diodes or similar illuminated portions to identify a particular problem.

A preferred communications system for the present invention is the known DeviceNet system which is an industry standard industrial network based upon the so-called CAN ("Controller Area Network") which was developed by Alan Bradley Corporation and is maintained by the Open DeviceNet Vendor Association. This DeviceNet system permits the event based networking approach which allows the devices, such as the sender's solenoids and rotation device, to communicate all necessary data among themselves in a timely fashion. See, generally, U.S. Pat. No. 5,539,778.

In particular, I/O and Explicit Messaging defined within the DeviceNet specification allows peer-to-peer communication schemes which are well suited to master lists, multi-processor environments.

The microcontroller boards may be employed to perform a wide variety of control and monitoring functions. In general terms, the functions respond to reference signals that are generated by other functions and transmitted over the network. Examples of the various types of functions, the reference signals that they generate, and the reference signals that they respond to are described as follows:

Transmit Reference Message on Input Transitions

A sensor input is monitored. A reference signal may be transmitted when the sensor turns ON. A reference signal may be transmitted when the sensor turns OFF.

Single State Check Based on External Events

A reference signal is received. The state (ON or OFF) of the sensor is monitored. If the sensor is not at the desired state when the reference signal is received, a reference signal is transmitted. It will be appreciated that the function may respond to more than one reference signal, and generate more than one reference signal.

Check Input Events During External Events

Sensor input events (transitions ON, OFF, ON-OFF-ON, or OFF-ON-OFF) will be counted during an external event. A reference signal is received to indicate the start of the external event. Another reference signal is received to indicate the completion of the external event. If the number of input events is greater than, less than, equal to, or not equal to preset number, a reference signal is transmitted.

Check Events During a Time Period

Sensor input events (transitions ON, OFF, ON-OFF-ON, or OFF-ON-OFF) will be counted during a preset time period. A reference signal is received to indicate the start of the time period. At the completion of the time period, if the number of events is greater than, less than, equal to, or not equal to a present number, a reference signal is transmitted. The time period may be reset if the monitored event does not occur.

One Shot On Input

A sensor input is monitored. A reference signal is transmitted when an input transition (ON or OFF) is detected. Another reference signal is transmitted after a preset period of time.

Output Follows Reference Inputs

An output will be set (ON or OFF) upon receiving a reference signal. The function may respond to more than one reference signal. Reference signals may in turn be transmitted when the output is set (ON or OFF).

One Shot On Output

An output is set (ON or OFF) upon receiving a reference signal. After a preset time period, the output is reset back to its original state. The timer may be reset upon receiving a reference signal. Reference signals may in turn be transmitted when the output is set (ON or OFF).

On Delay

An output is set (ON or OFF) a preset time period after a reference signal is received. A reference signal may in turn be transmitted when the output is set (ON or OFF).

One Shot—Count External Events

An output is set (ON or OFF) when a reference signal is received. The output is reset (ON or OFF) after a present number of reference signals from another source are received. Receiving a reference signal from the first source may reset the count. Reference signals may in turn be transmitted when the output is set (ON or OFF).

On Delay—Count External Events

Receiving a reference signal initiates a counter. Reference signals from another source are received. The output is set (ON or OFF) after a preset number of reference signals is counted. Reference signals may in turn be transmitted when the output is set (ON or OFF).

It will be appreciated by those skilled in the art that these functions and others may be employed in the punch press progressive production within the context of the present invention in may ways depending on the specific manufacturing objectives.

The rotational device controls the rotation and skew functions of the control system. An intelligent motor/drive system with a DeviceNet interface is employed. There may be a separate device for each rotational chamber or one device could handle multiple rotational chambers.

Material thickness measuring devices read the thickness measurement sensor and send the value when a message relating to the state of a reference input is received. There may be a separate device for each measurement point or one device could be employed to handle multiple points. Multiple measuring points may be used to measure the material closest to the portion of the strip where a stack will be made from, where multiple stacks are being generated or to measure the thickness of the material at either side of the stock strip, wherein a calculated value for material thickness is used based on the output of the measuring points.

A control module is employed to receive the messages from the material thickness measuring device and the messages related to the state of reference input. These messages are utilized to generate stacks of interlocked laminations of a predetermined height. The control module operates a solenoid that controls the separation of the interlocked laminations.

It will be appreciated while for convenience of reference herein, emphasis has been placed upon the use of the present system in connection with a die shoe or punch section of a progressive stamping die employed to fabricate stators or rotors, the present invention is not so limited and the die monitors may be used for a wide variety of progressive stamping die operations making many different types of fabricated or semi-fabricated parts or components. While for convenience of reference herein, examples employing metal workpieces have been used, it will be appreciated that the invention may be employed with workpieces which are not metallic.

The die monitoring of the present invention may be employed for a wide variety of sensing and control activities above and beyond those specifically disclosed herein. For example, part ejection, part presence or absence, may be monitored.

The control signals and sensor derived information may be delivered to hard wired systems or transmitted over non-wired systems.

The present system provides automated means for effecting die setup, monitoring and control functions. Communication means are established between the plurality of microcontroller boards embedded within the die which microcontroller boards utilize information coming from sensor units throughout the die and control signals transmitted over the network to initiate appropriate control functions on an event basis.

It will be appreciated that the number of microcontroller boards employed and the number of functions per board, as well as the number of boards per module, may be varied in accordance with the preferred practice for a specific use.

It will be appreciated, therefore, that the present invention eliminates the need for the use of a remotely positioned central processing unit and the required multiple cable assembly. It also provides the dies with multiple microcontroller boards which receive feedback through a communication system from various sensors, solenoids and the rotation system, and emit appropriate control signals through the communication system to effect desired adjustments when appropriate. All of this is accomplished while eliminating the need for skilled workmen of the caliber required in prior art systems.

Whereas particular embodiments of the invention have been described herein for purposes of illustration, it will be evident to those skilled in the art that numerous variations of the details may be made without departing from the invention as defined in the appended claims.

What is claimed is:

1. A punch press apparatus for progressively manufacturing articles comprising
   a punch press,
   a cooperating punch section and die section for creating said articles from sheet stock moving therethrough,
   a plurality of microcontroller boards secured to said punch section or said die section or both,
   said microcontroller boards having a plurality of logic chips secured thereto,
   sensor means for monitoring operation of said apparatus and providing input information regarding a plurality of monitored conditions to said microcontroller boards,
   said microcontroller boards have means for processing said input information and emitting responsive control signals to other said microcontroller boards and control portions of said apparatus, and
   communication means for effecting communication (a) between said sensor means and said microcontroller boards, (b) among said microcontroller boards and (c) between said microcontroller boards and control portions of said apparatus, whereby said microcontroller boards will through receipt and processing of said input information for a plurality of monitored conditions and communicating with other said microcontroller boards effect control of a plurality of monitored press apparatus conditions.

2. The apparatus of claim 1 including said punch section and die section being a progressive metal stamping die.

3. The apparatus of claim 2 including said microcontroller boards being secured to said die section.

4. The apparatus of claim 2 including said articles being selected from the group consisting of rotors and stators.

5. The apparatus of claim 1 including
   said sheet stock being metal sheet stock.

6. The apparatus of claim 3 including
   said microcontroller boards being embedded within said die section.

7. The apparatus of claim 1 including
   said communication means having means for effecting communication among said microcontroller boards.

8. The apparatus of claim 6 including
   said microcontroller boards being recessed within said punch section, said die section or both.

9. The apparatus of claim 2 including
   a container disposed within a recess in said die section,
   said microcontroller boards being disposed within said container, and
   a sealing material covering said microcontroller boards.

10. The apparatus of claim 9 including
    said sealing material being an epoxy which substantially completely covers said logic chips, whereby removal of said epoxy will at least partially destroy said logic chips.

11. The apparatus of claim 4 including
    rotation means for rotating stacks of stator or rotor laminas.

12. The apparatus of claim 11 including
    display means for displaying information regarding said apparatus, and
    said display means being operatively associated with said communication means.

13. The apparatus of claim 8 including
    solenoid means for initiating predetermined functions in said apparatus responsive to predetermined control signals.

14. The apparatus of claim 6 including
    said sensor means including at least one sensor selected from the group consisting of triggered sensors, change-of-state sensors and output devices.

15. The apparatus of claim 8 including
    said sensors including sensors which monitor at least one of the following conditions: press position; lamina thickness; and rotation.

16. The apparatus of claim 2 including
    said microcontroller boards having means for issuing control signals responsive to information received by microcontroller boards relating to at least one condition selected from the group consisting of lamina or stack thickness, misfeed, stack separation, press position and counter-bore.

17. The apparatus of claim 15 including
    said press position sensors monitoring press open, press closed and at least one intermediate press position.

18. The apparatus of claim 1 including
    said microcontroller boards being permanently secured to said die section.

19. The apparatus of claim 18 including
    calibration means disposed exteriorly of said microcontroller boards for providing information to said communication means prior to initiating operation of said punch press.

20. The apparatus of claim 1 including
    said logic chips being disposed on both surfaces of at least one said microcontroller board.

21. The apparatus of claim 2 including
    at least one container having at least one said microcontroller board disposed therein, and
    said container disposed at least partially within a recess in said punch section or said die section.

22. The apparatus of claim 21 including
    a resinous material encapsulating each said microcontroller board.

23. The apparatus of claim 21 including
    at least two said containers.

24. The apparatus of claim 23 including
    said containers secured within recesses in said die portion, said punch portion, or both.

25. The apparatus of claim 24 including
    at least some of said containers having a plurality of said microprocessor boards.

26. The apparatus of claim 21 including
    at least one said container secured to said die section and at least one said container secured to said punch section.

27. The apparatus of claim 22 including
    said resinous material being epoxy.

28. A method of progressively manufacturing articles comprising providing a punch press having a cooperating punch section and die section for creating said articles from sheet stock moving therethrough, providing a plurality of microcontroller boards each having a plurality of logic chips within said punch section, said die section or both, sensing certain conditions of said apparatus and said sheet stock and delivering input information regarding a plurality of monitored conditions from sensors to said microcontroller boards, and responsive to receipt of said input information from said sensors, said microcontroller boards processing said input information and emitting responsive control signals from said microcontroller boards to other said microcontroller boards and portions of said press apparatus to control operation of said apparatus, whereby said microcontroller boards will through receipt and processing of said input information for a plurality of monitored conditions and communicating with other said microcontroller boards effect control of a plurality of monitored press apparatus conditions.

29. The method of claim 28 including providing said microcontroller boards in a recess in said die section.

30. The method of claim 28 including employing said method to manufacture articles selected from the group consisting of rotors and stators.

31. The method of claim 28 including employing said microcontroller boards to issue control signals responsive to information received thereby relating to at least one condition selected from the group consisting of lamina or stack thickness, misfeed, stack separation, press position and counter-bore.

32. The method of claim 28 including employing said sensors to monitor at least one condition selected from the group consisting of press position, lamina thickness and rotation.

33. The method of claim 28 including displaying visually readable information regarding specific conditions of said apparatus.

34. The method of claim 28 including providing said microcontroller boards on both said punch section and said die section.

35. The method of claim 28 including employing at least one container having at least one said microcontroller board disposed therein and positioning said containers at least partially within a recess in said punch section or said die section.

36. The method of claim 35 including encapsulating said microcontroller boards with a resinous material.

37. The method of claim 28 including employing only one said microcontroller board in each said container.

38. The method of claim 28 including employing a plurality of said microcontroller boards in at least some of said containers.

39. The method of claim 28 including employing a total of at least two said containers, and said containers being disposed within recesses in said punch section, said die section, or both.

40. The method of claim 39 including securing said containers within recesses within said die portion, said punch portion, or both.

41. The method of claim 40 including providing at least some of said containers with a plurality of said microprocessor boards.

42. The method of claim 34 including securing at least some of said containers to said die section and at least some of said containers to said punch section.

43. The method of claim 27 including employing epoxy as said resinous material.

* * * * *

UNITED STATES PATENT AND TRADEMARK OFFICE
CERTIFICATE OF CORRECTION

PATENT NO. : 6,101,857
DATED : August 15, 2000
INVENTOR(S) : Ronald R. Fox et al.

Page 1 of 1

It is certified that error appears in the above-identified patent and that said Letters Patent is hereby corrected as shown below:

<u>Column 6,</u>
Line 25, "set" should read -- sent --.

<u>Column 12,</u>
Line 36, "claim 27" should read -- claim 36 --.

Signed and Sealed this

Fourteenth Day of May, 2002

Attest:

Attesting Officer

JAMES E. ROGAN
*Director of the United States Patent and Trademark Office*